(12) United States Patent
Avudainayagam et al.

(10) Patent No.: US 8,781,006 B2
(45) Date of Patent: Jul. 15, 2014

(54) LINK ADAPTATION IN MULTI-CARRIER COMMUNICATION SYSTEMS

(75) Inventors: Arun Avudainayagam, Gainesville, FL (US); Deniz Rende, Gainesville, FL (US); Hassan Kaywan Afkhami, Ocala, FL (US); Lawrence Winston Yonge, III, Summerfield, FL (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 12/980,792

(22) Filed: Dec. 29, 2010

(65) Prior Publication Data

US 2011/0286544 A1 Nov. 24, 2011

Related U.S. Application Data

(60) Provisional application No. 61/347,058, filed on May 21, 2010.

(51) Int. Cl.
*H04L 27/28* (2006.01)

(52) U.S. Cl.
USPC .......................................................... 375/260

(58) Field of Classification Search
CPC .............. H04B 1/00; H04B 7/00; H04B 7/02; H04J 1/00; H04K 1/10; H04L 5/12; H04L 27/00; H04L 27/20; H04L 27/28; H03M 13/00; H03M 13/23; H04N 7/64
USPC ......... 370/203, 252, 329, 332, 335, 338, 364, 370/431; 375/229, 260, 265, 267, 295, 340, 375/341; 455/69, 338; 714/755, 786, 792, 714/801
See application file for complete search history.

(56) References Cited

U.S. PATENT DOCUMENTS 5,691,995 A   11/1997   Ikeda
6,044,116 A * 3/2000   Wang ............................ 375/265

(Continued)

FOREIGN PATENT DOCUMENTS

JP   H07283740 A   10/1995
JP   2006041948 A   2/2006

(Continued)

OTHER PUBLICATIONS

Tan, S.S. et al., "Adaptive Modulation for OFDM-based Multiple Description Progressive Image Transmission." IEEE Globecom 2008, Global Telecommunications Conference, New Orleans, Nov. 30, 2008-Dec. 4, 2008, pp. 1-5.

(Continued)

*Primary Examiner* — Sam K Ahn
*Assistant Examiner* — Shawkat M Ali
(74) *Attorney, Agent, or Firm* — DeLizio Gilliam, PLLC (57) ABSTRACT

A method for transmitting information in a multi-carrier system includes: identifying a first set of carrier signals, associated with a first code rate; and identifying a second set of carrier signals, associated with a second code rate. The method also includes partitioning a first sequence of bits representing a single symbol into a first group of bits associated with the first code rate and at least a second group of bits associated with the second code rate; interleaving a subset of bits from the first group to map multiple bits from the first group to respective carrier signals in the first set of carrier signals to achieve the first code rate; and interleaving a subset of bits from the second group to map multiple bits from the second group to respective carrier signals in the second set of carrier signals to achieve the second code rate.

30 Claims, 7 Drawing Sheets

(56) References Cited

U.S. PATENT DOCUMENTS

| | | | |
|---|---|---|---|
| 6,088,387 A | | 7/2000 | Gelblum et al. |
| 6,134,273 A | | 10/2000 | Wu et al. |
| 6,158,041 A | * | 12/2000 | Raleigh et al. ............... 714/792 |
| 6,205,410 B1 | | 3/2001 | Cai |
| 6,259,746 B1 | | 7/2001 | Levin et al. |
| 6,310,909 B1 | | 10/2001 | Jones |
| 6,405,338 B1 | * | 6/2002 | Sinha et al. ................... 714/752 |
| 7,002,900 B2 | | 2/2006 | Walton et al. |
| 7,012,883 B2 | | 3/2006 | Jalali et al. |
| 7,031,397 B1 | * | 4/2006 | O'Neill ........................ 375/265 |
| 7,164,649 B2 | | 1/2007 | Walton et al. |
| 7,324,600 B2 | | 1/2008 | Pauli et al. |
| 7,421,030 B2 | * | 9/2008 | Bolinth et al. ................ 375/260 |
| 7,519,127 B2 | | 4/2009 | Tanabe |
| 7,706,455 B2 | * | 4/2010 | Davydov et al. ............. 375/260 |
| 2003/0095508 A1 | | 5/2003 | Kadous et al. |
| 2004/0146025 A1 | * | 7/2004 | Hwang et al. ................ 370/334 |
| 2005/0157638 A1 | | 7/2005 | Maltsev et al. |
| 2006/0036924 A1 | | 2/2006 | Ghosh |
| 2007/0121742 A1 | | 5/2007 | Tamaki |
| 2007/0147521 A1 | * | 6/2007 | Horng et al. .................. 375/260 |
| 2007/0213013 A1 | * | 9/2007 | Kim ................................ 455/69 |
| 2007/0291853 A1 | | 12/2007 | Kim et al. |
| 2008/0031746 A9 | | 2/2008 | Gray et al. |
| 2008/0232340 A1 | | 9/2008 | Wan et al. |
| 2008/0317146 A1 | | 12/2008 | Kwon et al. |
| 2009/0022242 A1 | * | 1/2009 | Waters et al. ................. 375/299 |

FOREIGN PATENT DOCUMENTS

| | | |
|---|---|---|
| JP | 2007135021 A | 5/2007 |
| JP | 2009515418 A | 4/2009 |
| TW | 201210274 | 3/2012 |
| WO | 2011146840 | 11/2011 |

OTHER PUBLICATIONS

International Search Report—PCT/US2011/037347—ISA/EPO—Oct. 3, 2011.

PCT Application No. PCT/US2011/037347 International Preliminary Report on Patentability, Jul. 13, 2012, 9 pages.

Korean Application No. 10-2012-7033460, Office Action, 8 pages, Dec. 23, 2013.

Japanese Application No. 2013-512097, Office Action, Jan. 28, 2014, 6 pages.

* cited by examiner

LINK ADAPTATION IN MULTI-CARRIER COMMUNICATION SYSTEMS

CROSS-REFERENCE TO RELATED APPLICATIONS

This application claims priority to U.S. Provisional Application Ser. No. 61/347,058, filed on May 21, 2010 the entire content of which is incorporated herein by reference.

TECHNICAL FIELD

This description relates to link adaptation in multi-carrier communication systems.

BACKGROUND

Orthogonal frequency division multiplexing (OFDM) is a common approach to implement a multi-carrier communication system that uses a very large bandwidth over a frequency-selective communication medium. OFDM systems typically use multiple carriers at different frequencies that experience different fades, for example, due to different channel attenuations and different phase rotations. Link adaptation deals with tailoring the amount of data on a carrier based on the physical characteristics of the communication medium.

Link adaptation including, for example, bit-loading can be performed at various granularities. In some cases, the code rate and/or modulation size is adapted for different OFDM symbols and all carriers in a given OFDM symbol use substantially the same code rate and modulation size. In other cases, the carriers in each OFDM symbol can have the same code rate but different modulation size. Alternatively, multiple code rates can be achieved on each OFDM symbol, for example, by spreading the encoded bits on carriers associated with the same code rate across multiple OFDM symbols. Such an approach may increase the latency of the system, for example, if all of the multiple symbols need to be received for decoding. Multiple code rates can also be achieved by assigning small encoded blocks to carriers associated with the same code rate in a single OFDM symbol. This approach reduces the latency, but produces lower coding gains because of the reduced block size.

SUMMARY

In one aspect, in general, a method is described for transmitting information in a multi-carrier system. The method includes: identifying a first set of carrier signals, each carrier signal in the first set of carrier signals associated with a first code rate; identifying a second set of carrier signals, each carrier signal in the second set of carrier signals associated with a second code rate, the second code rate different from the first code rate; partitioning a first sequence of bits representing a single symbol into a first group of bits associated with the first code rate and at least a second group of bits associated with the second code rate; interleaving a subset of bits from the first group of bits to map multiple bits from the first group of bits to respective carrier signals in the first set of carrier signals to achieve the first code rate on an average over the first set of carrier signals; interleaving a subset of bits from the second group of bits to map multiple bits from the second group of bits to respective carrier signals in the second set of carrier signals to achieve the second code rate on an average over the second set of carrier signals; modulating one or more of the carrier signals in the first set of carrier signals using the mapped bits from the first group; and modulating one or more of the carrier signals in the second set of carrier signals using the mapped bits from the second group.

In another aspect, in general, an apparatus is described for transmitting information in a multi-carrier system. The apparatus includes a partitioning module including circuitry to: identify a first set of carrier signals, each carrier signal in the first set of carrier signals associated with a first code rate, identify a second set of carrier signals, each carrier signal in the second set of carrier signals associated with a second code rate, the second code rate different from the first code rate, partition a first sequence of bits representing a single symbol into a first group of bits associated with the first code rate and at least a second group of bits associated with the second code rate. The apparatus includes an interleaver including circuitry to: interleave a subset of bits from the first group of bits to map multiple bits from the first group of bits to respective carrier signals in the first set of carrier signals to achieve the first code rate on an average over the first set of carrier signals, and interleave a subset of bits from the second group of bits to map multiple bits from the second group of bits to respective carrier signals in the second set of carrier signals to achieve the second code rate on an average over the second set of carrier signals. The apparatus includes a modulator including circuitry to: modulate multiple carrier signals in the first set of carrier signals using the mapped bits from the first group, and modulate multiple carrier signals in the second set of carrier signals using the mapped bits from the second group.

Among the many advantages of the invention (some of which may be achieved only in some of its various aspects and implementations) are the following.

A single OFDM symbol can be encoded using different code rates. Information can be encoded on different carriers using a low base-rate FEC code and using puncturing to achieve different code rates. This allows for link-adaptation to be performed at a finer granularity where a different code rate and modulation scheme can be selected for each carrier, thereby increasing the throughput. High coding gains can be achieved without compromising on latency by avoiding coding across a large number of OFDM symbols.

Other aspects and advantages will be apparent from the detailed description, drawings, appendices and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
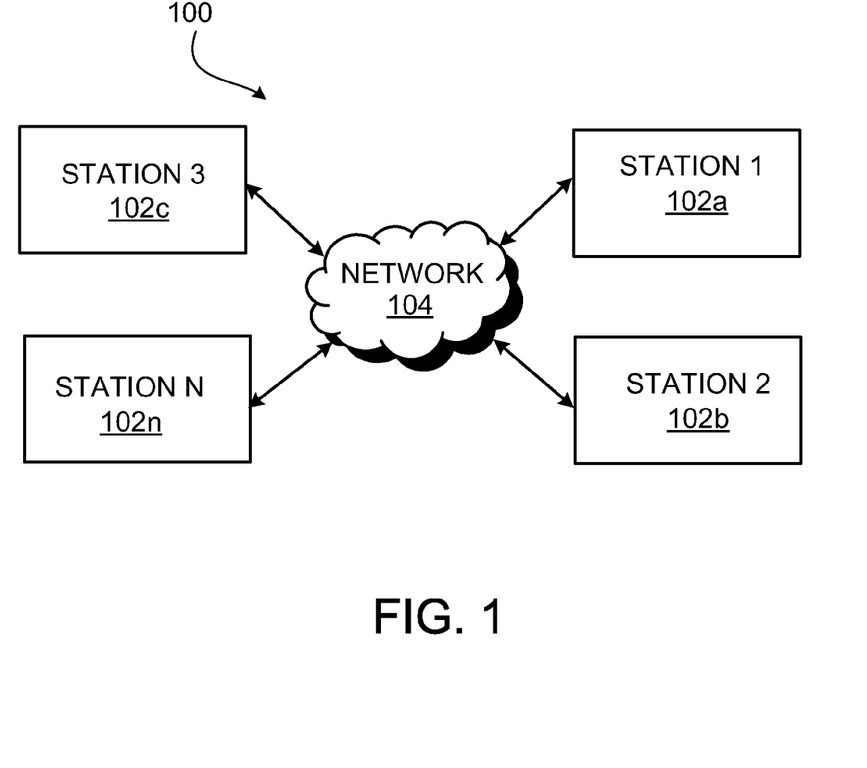
FIG. 1 is a schematic diagram illustrating a multi-carrier communication network in accordance with some embodiments.

FIG. 1 shows a system 100 of an exemplary multi-carrier communications network having a plurality of stations communicating with each other. The system 100 includes a plurality of stations 102a-102n communicating with each other over a network 104. The network 104 may include one or more different types of network. For example, the network 104 may include a local area network (LAN), such as a company intranet or a home network. In some implementations, the network 104 may include a metropolitan area network (MAN) or a wide area network (WAN) such as the Internet. In other implementations, the network 104 may include a combination of one or more different types of network. For example, a LAN such as the home network may be connected to an external access network. In such cases, one or more gateway devices may act as interfaces between two different networks.

In some implementations, the network 104 may include one or more network devices connected to variants of the same type of network. For example, the home network could comprise of both wired LANs (that use a physical transmission medium like coaxial cable or electrical power lines or telephone cables) and wireless-LANs (that communicate over the air). The one or more network devices may be connected via one or more gateway devices to an external network such as the internet. The gateway device may be connected by any type and form of connection to the external network including a broadband connection or a dialup connection. The gateway device may be connected via one or more bridges to other home network segments. The home network segments may be based on a home networking technology such as one based on power line networks.

The network 104 can be of any type and form and may include any of the following: a point-to-point network, a broadcast network, a computer network, a power line network, an Asynchronous Transfer Mode (ATM) network, a Synchronous Optical Network (SONET), a Synchronous Digital Hierarchy (SDH) network, a wireless network, a wired network, or the like. If the network 104 is at least in part a wired network, the network 104 may include one or more of the following: coaxial cable, power line wires, twisted pair wires or any other form and type of wired connection. The topology of the network 104 may be a bus, star or a ring topology or any other topology capable of supporting the operations described herein.

In some implementations, the network 104 may be a Broadband Power Line Network (BPLN) that provides access to a backhaul network. A BPLN can be managed by a service provider entity having access to the underlying physical power line medium. A BPLN is a general purpose network that can be used for several types of applications including, smart grid management, broadband internet access, voice and video delivery services, etc. In various implementations, a BPLN can be deployed on low voltage, medium voltage and high voltage power lines. Additionally, a BPLN can span an entire neighborhood or it may be deployed within a single multi-dwelling unit. For example, it can be used to provide network service to tenants in a single apartment building. While power lines are one medium for deploying the BPLN, similar techniques can be deployed on other wire lines, such as, for example, coaxial cables, twisted pair or a combination thereof.

The system 100 includes a plurality of stations 102a-102n (102 in general). In some implementations, the stations 102 may be stations in a BPLN that can share certain functionality such as a common security protocol. In some implementations, the stations 102 may include a Head End (HE), Repeaters (R), and Network Termination Units (NTUs). In other implementations, various types of Customer Premises Equipment (CPE) stations (e.g., a computer) can be used as endpoint nodes in the network. Such stations may communicate with other nodes in the network through one or more of the NTU, any number of repeaters, (e.g., including no repeaters), and the Head End.

In some implementations, the stations 102 may be nodes of a home network (FIN) communicating with each other using a home networking technology. The stations 102 may communicate with each other using any of a variety of communication protocols. In one implementation, each node in the network may communicate as a communication "station" using a PHY layer protocol that is used by the nodes to send transmissions to any other stations that are close enough to successfully receive the transmissions. Stations that cannot directly communicate with each other may use one or more repeater stations to communicate with each other. In some implementations, one of the stations 102a may act as a master node or station that controls, at least in some way, the other stations 102. In other implementations, there may be more than one master node in a network 104. In such cases, more than one master node may share responsibilities or work in cooperation with each other. In some implementations, the master node(s) 102a may need to receive overhead information transmitted by any other station 102 in the network 104.

In some implementations, the stations 102 communicate with each other using data units or data packets. In some of these implementations, the data units may be transmitted over the air (wireless) or over phone wire media, power line cables or coaxial cables, for example, using a physical layer protocol as a Physical Layer Protocol Data Unit (PPDU). The data units or packets may include a payload part with information to be delivered to a station and may include overhead information. The payload part may include, for example, application data and/or management information, (e.g., in some cases, in the form of a packet of a higher layer protocol). The overhead information may include information associated with encoding or modulation of information in the payload or with a communication protocol used by the stations in the network. The overhead information may include, for example, a preamble used to detect the start of the data unit, a header (also called a frame control field) after the preamble and before the payload, and a trailing check sequence after the payload used to check the integrity of the transmission. As described in more detail below, in some cases, some or all of the overhead information can be included as part of the payload according to a given scheme for modulating the payload.

Any of a variety of communication system architectures can be used to implement the portion of the network interface module that converts data to and from a signal waveform that is transmitted over the communication medium. An application running on a station provides and receives data to and from the network interface module in segments. A "MAC Service Data Unit" (MSDU) is a segment of information received by the MAC layer. The MAC layer can process the received MSDUs and prepares them to generate "MAC protocol data units" (MPDUs). A MPDU is a segment of information including a header (e.g., with management and overhead information) and payload fields that the MAC layer has asked the PHY layer to transport. A MPDU can have any of a variety of formats based on the type of data being transmitted.

A "PHY Protocol Data Unit (PPDU)" refers to the modulated signal waveform representing a MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables stations to share the power line medium. Several types of channel access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanism can also be used. The Physical layer (PHY) can also use a variety of techniques to enable reliable and efficient transmission over the transmission medium (power line, coax, twisted pair etc). Various modulation techniques, such as, but not limited to, Orthogonal Frequency Division Multiplexing (OFDM) and Wavelet modulations can be used. Forward error correction (FEC) codes such as, but not limited to, Viterbi codes, Reed-Solomon codes, concatenated code, turbo codes, low density parity check code, etc., can be employed by the PHY to detect and correct errors in the transmission.

Some implementations of the multi-carrier PHY layer use OFDM modulation. In OFDM modulation, data is transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 2:
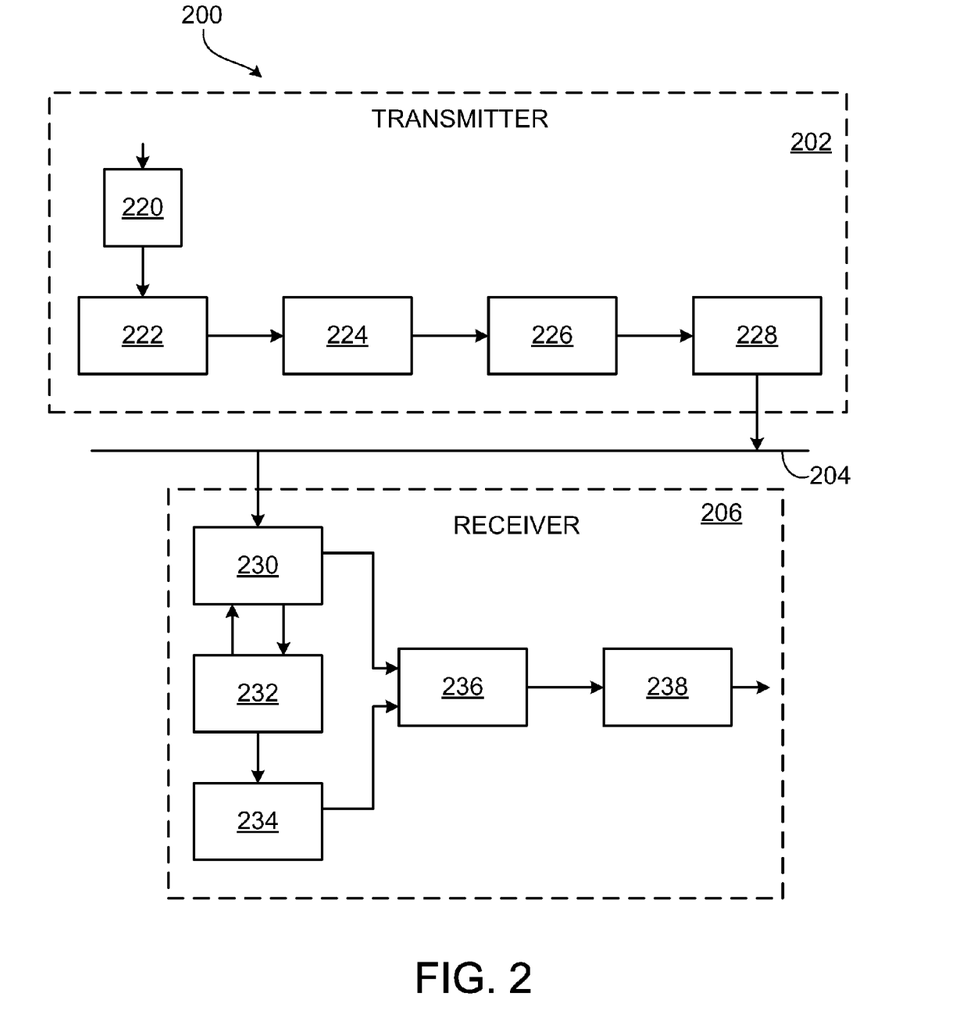
FIG. 2 is a block diagram illustrating a communication system using the multi-carrier network in accordance with some embodiments.

Referring to FIG. 2, a communication system 200 within the multi-carrier communications network 100 can include a transmitter 202 for transmitting a signal (e.g., a sequence of OFDM symbols) over a communication medium 204 to a receiver 206. The transmitter 202 and receiver 206 can both be incorporated into a network interface module (not shown) at each station 102. The communication medium 204 is the path through the Network 104 that is used for data exchange between 2 stations 102a and 102b. In an embodiment using a power line network, for example, the communication medium 204 can represent a path from one device to another over the power line within the network 104.

At the transmitter 202, modules implementing the PHY layer receive an MPDU from the MAC layer. The MPDU is sent to an encoder module 220 to perform processing such as scrambling, error correction coding and interleaving.

The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM, 64-QAM, 256-QAM or 1024-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i=A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 also determines which of the carrier frequencies $f_1, \ldots, f_N$ within the OFDM bandwidth are used by the system 200 to transmit information. For example, some carriers that are experiencing fades can be avoided, and no information is transmitted on those carriers. Instead, the mapping module 222 may use coherent BPSK modulated with a binary value from the Pseudo Noise (PN) sequence for that carrier. For some carriers (e.g., a carrier i=10) that correspond to restricted bands (e.g., an amateur radio band) on a medium 204 that may radiate power, no energy is transmitted on those carriers (e.g., $A_{10}=0$). The mapping module 222 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 224 performs the modulation of the resulting set of N complex numbers (some of which may be zero for unused carriers) determined by the mapping module 222 onto N orthogonal carrier waveforms having peak frequencies $f_1, \ldots, f_N$. The modulated carriers are combined by IDFT module 224 to form a discrete time symbol waveform S(n) (for a sampling rate $f_R$), which can be written as $$S(n) = \sum_{i=1}^{N} A_i \exp[j(2\pi i n / N + \Phi_i)] \quad \text{Eq. (1)}$$

where the time index n goes from 1 to N, Ai is the amplitude and $\Phi_i$ is the phase of the carrier with peak frequency $f_i=(i/N)f_R$, and $j=\sqrt{-1}$. In some implementations, the inverse discrete Fourier transform corresponds to an inverse fast Fourier transform (IFFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function $g(\tau; t)$ representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). In some implementations, the discrete Fourier transform corresponds to a fast Fourier transform (FFT) in which N is a power of 2.

Demodulator/Decoder module 238 maps the complex numbers onto the corresponding bit sequences and performs the appropriate decoding of the bits (including de-interleaving and descrambling).

Any of the modules of the communication system 200 including modules in the transmitter 202 or receiver 206 can be implemented in hardware, software, or a combination of hardware and software. The modules can also be implemented using different techniques, as described in more detail in the various examples herein.

Orthogonal frequency division multiplexing (OFDM) is a common approach to implement a multi-carrier communication system that uses a very large bandwidth over a frequency-selective communication medium. A frequency-selective communication medium may be characterized by having a frequency response whose magnitude is not flat over the used frequency band. In other words, different frequencies in the used frequency band experience different fades, which can be due to different channel attenuations and different phase rotations. In some cases, the available bandwidth can be split into a number of narrow frequency bands or carriers such that frequencies within a given frequency band experience substantially similar fading. Such substantially similar fading within a frequency band is sometimes referred to as flat fading. For flat fading, the fading on each carrier can be characterized by a unique amplitude and phase response that can potentially change over time. In general, each carrier in a multi-carrier communication system has a different characteristic. Therefore, in some cases, it could be of interest to increase or substantially maximize a throughput of the system by adapting the amount of information or data placed on each carrier to the corresponding channel condition (amount of fading) for that carrier at the time of transmission. This general approach of tailoring the amount of data on a carrier to the physical characteristics of the communication medium is referred to as link adaptation.

In some implementations, link adaptation can be achieved by controlling one or more of the power, modulation scheme (e.g., using a given constellation corresponding to an arrangement of symbols of a modulation alphabet in the complex plane representing modulation amplitude and phase), and code rate of forward error correction (FEC) on each carrier. The number of symbols in a modulation alphabet can be referred to as the modulation size. Different modulation schemes used for different carriers can include different modulation sizes and different arrangement of symbols in a constellation. In some implementations, communication systems use constant power modulation formats, in which symbols from all modulation alphabets are assigned the same power. In other cases, the power assigned to symbols from different modulation alphabets can be varied. For example, the power on each carrier can be adapted by adjusting the amplitude of the complex numbers at the output of the mapping module 222. The amount by which the power on a carrier is adjusted may depend on the fading characteristics experienced by that carrier. In some implementations, only the modulation scheme and code rate on each carrier is varied while keeping the power substantially the same for all alphabets. Varying the modulation scheme and code rate on each carrier can change the number of information bits transported on each carrier. Therefore, some forms of link adaptation are also referred to as bit-loading.

Link adaptation or bit-loading can be performed at various granularities. For instance, some technologies, such as 802.11a/g, have a fixed set of code rate and/or modulation size combinations that can be used. In some implementations, a module performing link adaptation can choose the code rate and/or modulation size based on a metric such as an average-metric that measures the quality of the channel. The metric can be a performance related metric such as an average signal-to-noise ratio (SNR) estimate, average block error rate (BLER) or bit error rate (BER) that is observed at the receiver. In some implementations, the metric can also be related to a channel parameter estimated by the transmitter. Examples of such parameters include delay spread, coherence bandwidth, and attenuation.

In receiver-driven bit-loading, the receiver estimates the metric of interest, and informs the transmitter of the value of the estimated metric via feedback such as a message that is sent during a connection setup procedure. In some implementations, the receiver may compute the bit-loading parameters based on the estimated metric and provide the information to the transmitter. Based on information about the estimated metric and/or bit-loading parameters, a code rate and/or modulation size can be selected, and all carriers in a given OFDM symbol may use substantially the same selected code rate and/or modulation size.

Figure 3:
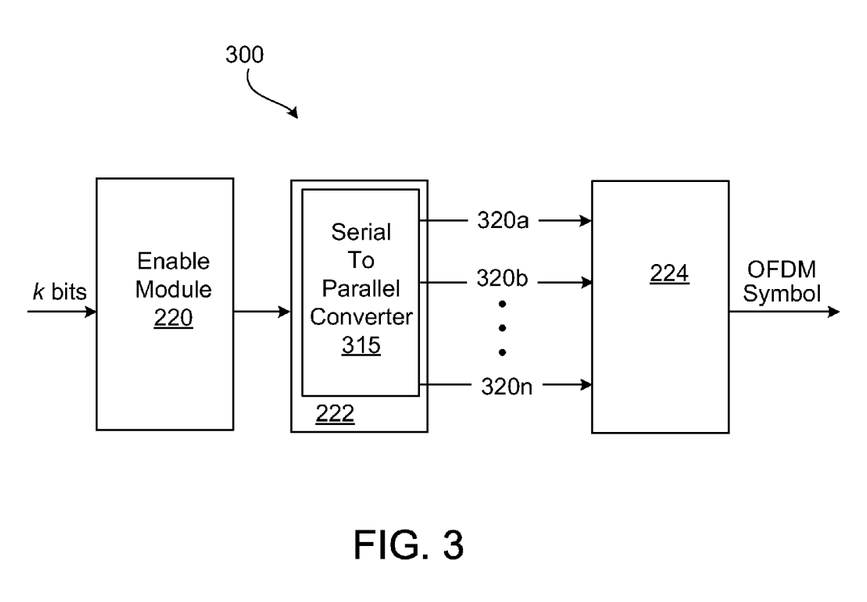
FIG. 3 is a block diagram illustrating the components of an example of a multi-carrier transmitter.

In multi-user systems, such as orthogonal frequency division multiple access (OFDMA) systems, each user is assigned a respective subset of carriers, e.g., for a downlink OFDM symbol, and link adaptation can be used for these carrier frequencies. Parts of an embodiment of a multi-carrier transmitter 202 is shown in FIG. 3.

A sub-system 300 of the embodiment of the transmitter 202 includes an encoder module 220 (e.g., as described with respect to FIG. 2). In some implementations, the encoder module 220 can include an error correction module and a puncturing module. The encoder module can also include additional modules and/or circuitry as will be explained below in further detail. The error correction module can be configured to introduce error control bits in the data to be transmitted through the application of an error control code. The error control code can include an error detection code or an error correction code. For example, the error correction module can be configured to apply a forward error correction code (FEC) on bits in a MPDU. In some implementations, the introduced FEC can be a systematic code. In such cases, the error correction module adds a certain number of parity or redundancy bits to a block of data of a given number of bits. In some implementations, the FEC is a non-systematic. In such cases, the error correction module accepts a first set of bits as input and outputs a second set of bits derived from the first set of bits. The second set of bits are sometimes also referred to as parity or redundancy bits. In general, the error correction module receives a first number of bits (e.g., k bits) and outputs a higher number of bits in accordance to a code rate $R_b$ of the error correction code used in the error correction module. There are many possible choices for the FEC used in the error correction module, some of which include block codes, convolutional codes and concatenated codes like turbo and low-density parity-check codes (LDPC).

In some implementations, the encoder module 220 can also include a puncturing module. The puncturing module removes some of the parity or redundancy bits after encoding with an error-correction code, for example, by selecting a subset (i.e., fewer than all) of the bits from a group of bits to be mapped to respective carrier signals to achieve a given code rate on average over those carrier signals. In some cases, this can have substantially the same effect as encoding with an error-correction code with a higher rate, or less redundancy. The use of a puncturing module allows the use of the same decoder regardless of how many bits are punctured. Therefore, the puncturing module increases the flexibility of the overall system without significantly increasing its complexity. In general, the puncturing module increases the code rate of the system relative to code rate $R_b$ of the error correction code being used.

The sub-system 300 can also include one or more of a mapping module 222 (e.g., as described with respect to FIG. 2) and an IDFT module 224 (e.g., as described with respect to FIG. 2). In some implementations, the mapping module 222 includes a serial to parallel converter 315 that converts a serial stream of data corresponding to an OFDM symbol into data streams 320a-320n corresponding to n different carrier frequencies, respectively. The mapping module 222 may also assign a code rate and modulation parameter, e.g., modulation size, to the different carriers. For example, the mapping module 222 can assign a fixed code rate and modulation size combination (for example, a code rate R and $2^M$-QAM modulation) for all the carriers assigned to a particular user. In such a case, the data streams 320a-320n corresponding to the n different carrier frequencies will each carry a same number of bits (e.g. $m_1$) for a given OFDM symbol.

In some implementations, some carriers modulated in a particular symbol may support a higher order modulation and/or code rate than other carriers modulated in the same symbol. In such cases, such as in some multi-carrier communication systems (for example, digital subscriber lines (DSL), and HomeplugAV based power-line systems), link adaptation can be done by allowing different modulation sizes on each carrier modulated within a given symbol based on a metric such as an estimate of the carrier signal to noise ratio (SNR). Once the modulation alphabets on each carrier is decided, a fixed code rate can be chosen for all the carriers based on an average channel metric such as the block error rates. In such cases, the carriers in each OFDM symbol have the same code rate but may have different modulation alphabets. Referring again to FIG. 3, in such a case, the data streams 320a-320n corresponding to the n different carrier frequencies each carry a different number of bits (e.g., $m_1$-$m_n$, respectively) for a given OFDM symbol even though all the carriers are modulated with information encoded at the same code rate R. In some implementations, multiple code rates can be achieved on each OFDM symbol, by spreading the encoded bits on carriers associated with the same code rate across multiple OFDM symbols. In such cases, the FEC is performed across multiple OFDM symbols.

In some cases, $N_r$ possible code rates ($R_1, R_2, \ldots, R_{Nr}$) are assumed for an OFDM symbol. Therefore there can be $R_{Nr}$ information blocks (for example, of k bits each) that are individually encoded with a different rate. In such cases the encoder module 220 typically has n=$N_r$ error correction modules and $N_r$ puncturing modules, each error correction module and each puncturing module corresponding, in general, to a different code rate. In some implementations, the encoder module 220 can also have additional modules and/or circuitry. The encoded codewords are then multiplexed onto different carriers of sequential OFDM symbols by the mapping module 222 which, in this case includes $N_r$ serial to parallel converters 315a-315n (315 in general). In some implementations, different sets of carriers are assigned a separate code rate and a separate modulation scheme. For example, if $C_1$ carriers are assigned a code rate $R_1$ and $2^{M1}$-QAM modulation, the total number of bits carried by the $C_1$ carriers is $M_1 C_1$. Thus, each OFDM symbol has $C_i$ carriers with $2^{Mi}$-QAM modulation encoded at rate $R_i$. In such cases, the information block size for the FEC is k bits, and therefore a total of $N_{s1}$=k/($R_1 M_1 C_1$) OFDM symbols are needed to transmit the FEC block corresponding to rate $R_1$. To decode an FEC block encoded in this manner, the decoder uses all the symbols over which the block is spread at the encoder. In general, when decoding a FEC block with rate $R_1$, there is a latency of $N_{s1}$ OFDM symbols before decoding can start. These $N_{s1}$ OFDM symbols are stored before decoding starts, and in general requires a large buffer. In some implementations, each code rate is associated with the same modulation size. In other implementations, mixed modulation for each code rate block is also possible.

In some implementations, the latency/buffering requirements can be reduced by avoiding coding across multiple OFDM symbols. In such cases, the information is first divided into $N_r$ blocks of size $k_1, k_2, \ldots, k_{Nr}$, by the serial to parallel converter 315 which are then supplied to the encoder module 220. Error correction can then be applied by error correction modules within the encoder module 220 to each block of bits. Preferably, FEC is applied on each block of bits separately. In general, $C_1$ carriers are assigned a code rate $R_1$ and $2^{M1}$-QAM modulation. Therefore, the input block size for the $C_1$ carriers is $k_1$=$M_1 C_1 R_1$. The information block size for each code rate may be relatively small (since the original information, that was k bits long, is divided into smaller blocks of data). In some implementations, each code rate is associated with the same modulation size. In other implementations, mixed modulation for each code rate block is also possible.

Figure 4:
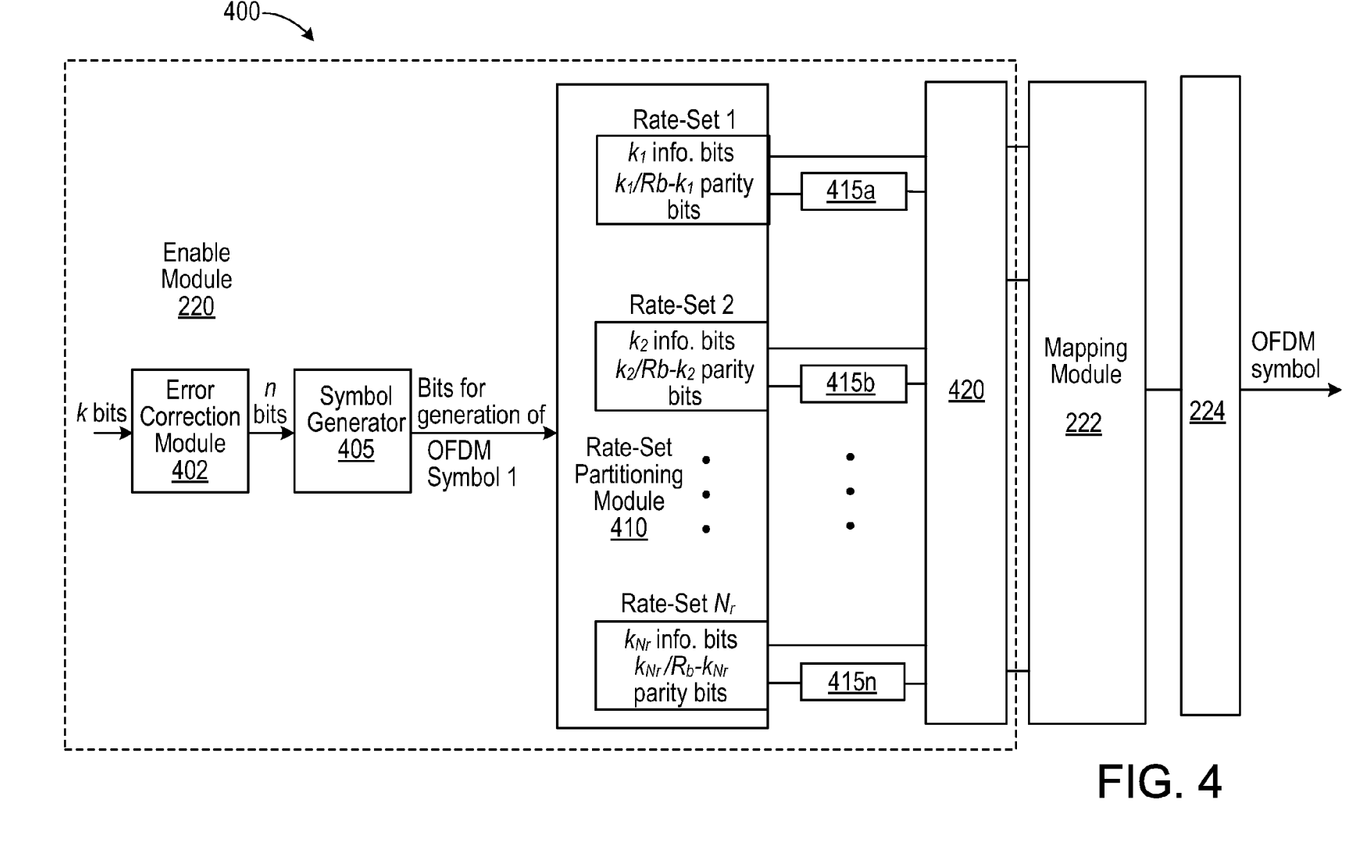
FIG. 4 is a block diagram of an example of a transmitter used in a multi-carrier communication system supporting multiple code rates in a single OFDM symbol in accordance with some embodiments.

Referring now to FIG. 4, a system 400 for rate set partitioning in a symbol is shown and described. The system 400 includes an error correction module 402. In some implementations, the error correction module 402 encodes k information bits with a FEC having a base rate $R_b$. This results in n coded bits at the output of the error correction module 402. In some implementations, the n bits may include k information bits (sometimes denoted by u) and (n-k) parity or redundancy bits (sometimes denoted by p). In some implementations, where non-systematic codes are used, the output of the error correction module 402 may have n parity bits.

The system 400 can also include a symbol generator 405 that groups FEC encoded bits into different symbols. In the example shown in FIG. 4, where a systematic code is being used, the FEC encoded bits are grouped into $N_{SYM}$ symbols each of which have $k_{SYM}$ information bits and $k_{SYM}/(R_b - k_{SYM})$ parity or redundancy bits.

The system 400 further includes a rate set partitioning module 410 that divides the encoded bits corresponding to one symbol into the $N_r$ rate sets. While FIG. 4 shows the processing blocks for a single OFDM symbol, similar processing can be repeated for each of the $N_{SYM}$ symbols. In some implementations, the rate set partitioning module 410 partitions or clusters the information and parity bits corresponding to a symbol into different rate sets.

In some implementations, the number of information or systematic bits in each cluster is determined as follows. In each rate set, the number of coded bits is obtained by summing up the number of bits on carriers in the group, and the number of information bits are obtained from the code rate and the number of coded bits. For example, the carriers with code rate $R_1$ have a total of $n_1$ coded bits and $k_1$ information bits given by:

$$n_1 = \sum_{i:R_{c,i}=R_1} b_i, \quad k_1 = n_1 R_1$$

Similarly, the carriers with code rate $R_2$ have a total of $n_2$ coded bits and $k_2$ information bits given by $$n_2 = \sum_{i:R_{c,i}=R_2} b_i, \quad k_2 = n_2 R_2$$

and proceeding in this way, the carriers with code rate $R_{Nr}$ have a total of $n_{Nr}$ coded bits and $k_{Nr}$ information bits given by $$n_{Nr} = \sum_{i:R_{c,i}=R_{Nr}} b_i, \quad k_{Nr} = n_{Nr} R_{Nr}$$

In some implementations, the values $k_1, k_2, \ldots, k_{Nr}$ are used to determine the number ($N_{SYM}$) of OFDM symbols required to transmit the k information bits. For example, the number of information bits that can be transmitted in one OFDM symbol ($k_{SYM}$) is calculated by adding the number of information bits in all rate set groups.

$$k_{SYM} = k_1 + k_2 + \ldots + k_{Nr}$$

The number of OFDM symbols can be determined as:

$$N_{SYM} = \left\lceil \frac{k}{k_{SYM}} \right\rceil,$$

where $\lceil x \rceil$ denotes the smallest integer greater than or equal to x.

In some implementations, clustering into different rate sets can be done using the values $k_1, k_2, \ldots, k_{Nr}$ and $N_{SYM}$. As described above, the output of the error correction module 402 is divided into $N_{SYM}$ groups with $k_{SYM}$ information bits in each group corresponding to one OFDM symbol. In each group, the $k_{SYM}$ information bits and the corresponding ($k_{SYM}/R_b - k_{SYM}$) parity bits (for systematic codes) are grouped together to form the coded bits for one OFDM symbol. The groups need not necessarily have consecutive or sequential bits. In some implementations, padding (for example, with zeros) may be used to ensure that each of the $N_{SYM}$ OFDM symbols have sufficient number of coded bits to fill out the corresponding carriers.

In some implementations, the rate set partitioning module 410 partitions the $k_{SYM}$ information bits into $N_r$ different sets of size $k_1, k_2, \ldots, k_{Nr}$, respectively. In some implementations, each rate set partition i ($1 \leq i \leq N_r$) includes $k_i$ information bits and the corresponding ($k_i/R_b - k_i$) parity or redundancy bits. The partitions may or may not include consecutive or sequential bits. In some implementations, the partitioning is done to maximize or optimize a cost function related to the performance of the code. For instance, if a turbo code is used as the FEC, then trellis sections that have parity bits punctured with a high code rate should be interspersed with trellis sections that have parity bits having a lower code rate to improve decoding performance. In this case, if there are only two rates to choose from and each rate is assigned exactly half of the information bits (along with the corresponding parity bits), then instead of assigning the first half to code rate 1 and the second half to code rate 2, better performance may be achieved by assigning alternate trellis sections to each code rate. Thus, given the number of rate sets, the set of code rates, and the number of information bits in each rate set, partitioning could be sequential, or performed in a manner that optimizes performance of the resulting system.

The example of FIG. 4 shows a systematic FEC where the rate sets include both information bits and parity bits. In the case of a non-systematic FEC, the rate sets may include parity bits only. The rate set partitioning module 410 enables puncturing to be applied to parity bits. In some cases, puncturing is not necessarily always applied to parity bits at the rate set partitioning module 410. In such cases, the ratio of the number of information bits to the number of coded (information+parity) bits in each group is substantially the same and equals $R_b$.

In some implementations, the system 400 further includes one or more puncturing module 415a, 415b, ..., 415n (415 in general). In some implementations, each rate set may have associated with it a dedicated puncturing module 415. In other cases, one or more rate sets may be associated with a common puncturing module 415. In some implementations, all bits in a rate set i will be punctured to the same code rate, $R_i$. Puncturing can be performed separately on each rate set to achieve the desired code rate for the given rate set. For instance, consider a rate set i that is assigned a code rate $R_i = k_i/n_i$. In such a case, out of the $k_i/R_b - k_i$ parity bits in rate set i, all but $n_i - k_i$ bits are punctured. Puncturing can be performed uniformly wherein certain equally spaced bits that are discarded before transmission. In some implementations, predefined puncturing patterns may also be used. Such predefined patterns may be used in order to maximize distance properties of the code or optimize the performance of the code (for example, with respect to one or more of frame error rate, bit error rate, or throughput) at specific operating conditions. In such cases, a predefined pattern of bits, for a given code rate, are discarded prior to transmission.

The system 400 may also include an interleaver 420. In some implementations, the interleaver 420 can be an interleaver bank having a plurality of interleavers 420a-420n (not shown). In such cases, each rate set may have associated with it a separate interleaver or more than one rate set may share an interleaver. The information bits and punctured parity bits corresponding to each rate set are passed through the interleaver 420 to obtain an interleaved pattern of bits. In some implementations, the interleaving can be performed separately for each rate set to guarantee that information and parity bits from a single rate set are mapped to carriers that support the corresponding code rate. In some implementations, an interleaver 420 for a given rate set can include two separate interleaving units (not shown), one for the systematic bits and the other for the parity bits, and the output of the two interleaving units can be multiplexed together. In some implementations, interleaving could be performed across all the rate sets by using a single interleaver 420.

In some implementations, the interleaving patterns can be defined for different block sizes as the numbers of the information and parity bits vary across code rate groups. In some implementations, algorithmic interleavers parameterized by block size and code rates can also be used. For example, an algorithmic interleaver can be configured to write bits into rows and then read out the written bits as columns with or without an offset. In such a case, the interleaving depths and read-out offsets can be defined based on the block size.

Even though the example in FIG. 4 shows the interleaver 420 after the rate set partitioning module 410, the interleaver 420 can also be placed before the rate set partitioning module 410. In such cases, the bits at the output of the symbol generator 405 are interleaved by the interleaver 420, and then passed through the rate set partitioning module 410. In such cases, the rate set partitioning module 410 and puncturing modules 415 can be provided with some information (for example, in the form of one or more parameters) about the interleaver 420 such that the modules 410 and/or 415 can pick the appropriate systematic and punctured parity bits from the interleaved data to put on each rate set.

The system 400 further includes a mapping module 222 that multiplexes and maps the interleaved information and parity bits from all rate sets to appropriate carriers using the tonemap. In this example, the tonemap $\{(M_1,R_{c,1}), (M_2,R_{c,2}), \ldots, (M_{Nc},R_{c,Nc})\}$ can be used by the mapping module 222. Continuing with the current example, consider a rate set i, which has $C_i$ carriers. The interleaved and multiplexed bits in rate set i can be sequentially assigned to the $C_i$ carriers by following the tonemap assignment for those carriers. In some cases, padding may be used at the output of each set of punctured bits before modulation mapping.

The system 400 also includes an IDFT module 224 (or other form of modulator) that operates on the mapped data to produce the OFDM symbol. In some implementations the system 400 may include hardware for performing other functionalities including, but not limited to, symbol shaping, cyclic extension, modulation-rotation and scaling The systems and operations described herein can be repeated for other symbols (for example, all $N_{SYM}$ OFDM symbols) until all of the k information bits are encoded as symbols for transmission.

In some implementations, for example, where capacity-approaching codes like turbo and low-density parity check (LDPC) codes are used, the input block-size is made sufficiently large to provide adequate coding gains. In such cases, link-adaptation algorithms that allow different code rates and modulation sizes on different carriers in a single OFDM symbol, can be used. Using different code rates and modulation sizes on different carriers of the same symbol can result in relatively low latency as well as relatively large coding gains.

Figure 5:
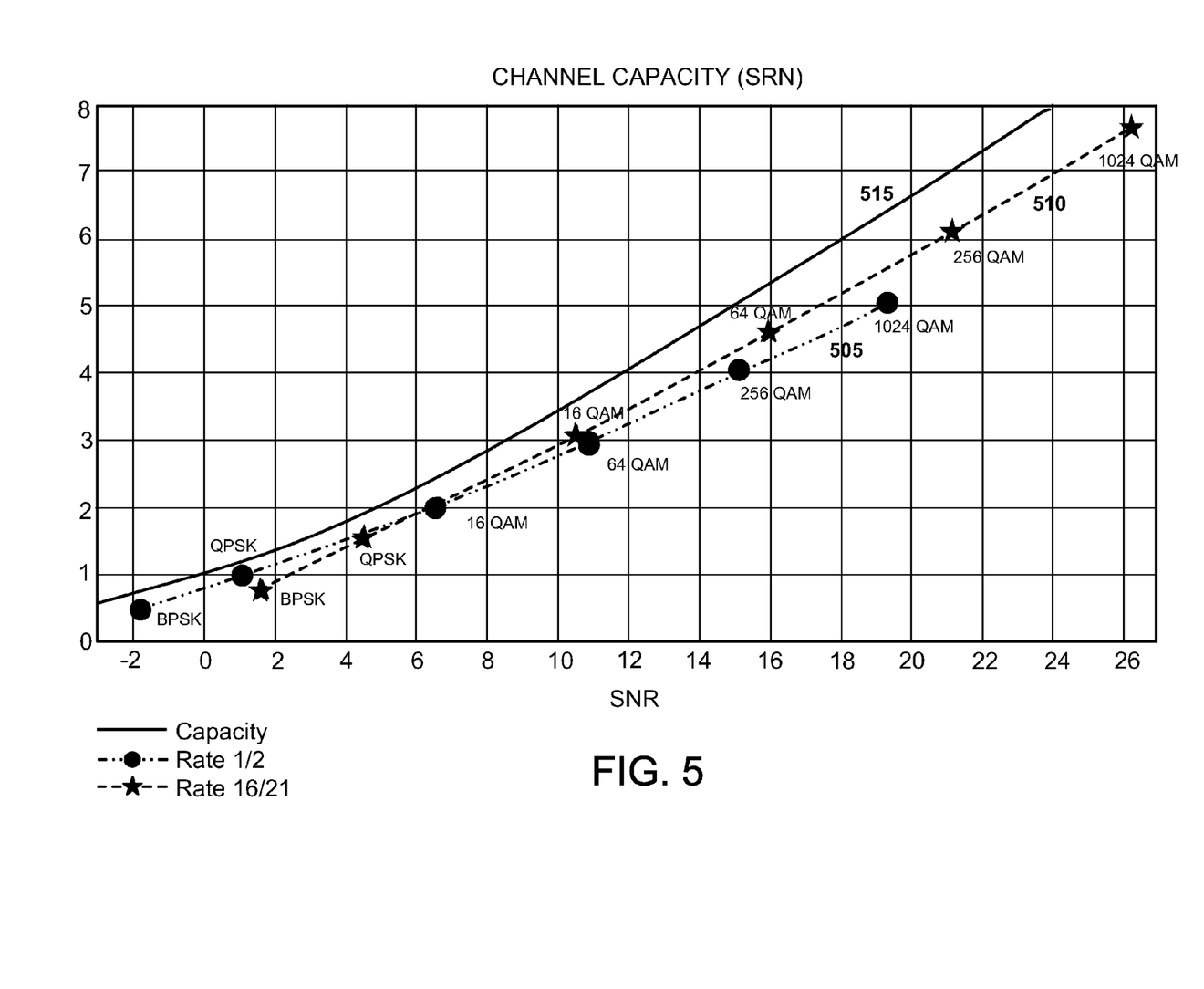
FIG. 5 is a graph illustrating the performance of different modulation schemes as a function of SNR and code rates.

Referring now to FIG. 5, the performance of different modulation schemes is shown as a function of SNR and code rates. In the plot shown in FIG. 5, the performance of a duo-binary convolution turbo code (TCC) is presented for different modulation schemes, BPSK, QPSK, 16QAM, 64QAM, 256QAM, and 1024QAM, and for the code rates of 1/2 and 16/21. The line 505 represents the code rate 1/2 and the line 510 represents the code rate 16/21. The line 515 represents the capacity limit as a function of the SNR. It is seen from FIG. 5 that higher code rates perform closer to capacity at high SNRs while lower code rates perform closer to capacity at low SNRs. For example, the TCC with code rate of 16/21 performs closer to capacity than the TCC with a code rate of 1/2 at SNRs higher than about 8 db. The TCC with code rate 1/2 performs closer to capacity than the TCC with code rate 16/21 at SNRs lower than about 8 dB. Therefore, in case of an OFDM symbol, carriers having SNRs less than about 8 dB can use 1/2 rate FEC, and carriers having SNRs higher than about 8 dB can use 16/21 rate FEC for an efficient transmission scheme. Similarly, other code rates corresponding to different SNRs are also possible.

The following notations are used in this document:

$N_r$: Number of distinct code rates. Accordingly, the carriers can be divided into $N_r$ groups each with a corresponding FEC rate.

$R_i$: Code rate in carrier-group i, $1 \leq i \leq N_r$.

$N_c$: Total number of carriers, $C_i$: Total number of carriers with code rate $R_i$, $1 \leq i \leq N_r$.

$R_{c,i}$: Code rate on carrier i, for, $1 \leq i \leq N_c$ $b_i$: Number of bits on carrier i, $1 \leq i \leq N_r$ k: Number of information bits in the input to the FEC code, n: Number of coded bits at the output of the FEC code.

$R_b$: Base code rate of the mother code, all other rates are obtained by puncturing the mother code $k_i$: Number of information bits in the input to the FEC code of rate $R_i$ ($1 \leq i \leq N_r$)

$n_i$: Number of coded bits at the output of the FEC code of rate $R_i$ ($1 \leq i \leq N_r$)

$N_{SYM}$: Number of OFDM symbols required to transmit k information bits.

$k_{SYM}$: Number of information bits in the input to the FEC encoder that can be transmitted in one OFDM symbol.

Note the following relationships between the above symbols:

$$R_b=k/n, R_i=k_i/n_i, N_c=C_1+C_2+\ldots+C_{Nr},$$

$$k_{SYM}=k_1+k_2+\ldots+k_{Nr}$$

$$k=k_{SYM}N_{SYM}$$

In some implementations, each carrier i is assigned a modulation scheme (for example quantified by a parameter $b_i$—the number of bits on the carrier i) and a code rate ($R_{c,i}$—the code rate on the carrier i) based on a metric that measures the quality of the carrier. For instance, this quality-metric can be based on fundamental parameters of the communication channel such as delay spread or coherent bandwidth. In some implementations, the metric can also be based on derived parameters like the signal-to-noise ratio (SNR), frame error rate or bit error rate, i.e. parameters that indicate the quality of the channel. The metric is typically compared to various thresholds and the carrier is assigned a modulation-code rate pair that maximizes a certain cost function (or performance metric). In some implementations, the cost function can be a throughput or a relative distance of the spectral efficiency for the modulation-code rate pair from the Shannon Capacity. The modulation-code rate pairs assigned to different carriers specify the bit-loading profile for the symbol and is referred to as a tonemap. In this example, the sequence of ordered pairs $\{(M_1,R_{c,1}), (M_2,R_{c,2}), \ldots, (M_{Nc}, R_{c,Nc})\}$ defines the tonemap for OFDM symbol 1. In some implementations, carriers with the same code rate can be clustered into groups called rate sets. The carriers in a rate set can be both sequential or non-sequential. In general, the carriers for a symbol are divided into $N_r$ rate sets with $C_1$, $C_2$, ..., $C_{Nr}$ carriers in each with corresponding code rates $R_1$, ..., $R_{Nr}$, respectively.

In some implementations, different rate sets can have different criteria for selecting a corresponding code rate for a given metric such as the SNR. For example the code rate for a particular rate set can be selected based on a desired throughput while the code rate for a different rate set is selected based on a relative distance of the spectral efficiency for the modulation-code rate pair from the Shannon Capacity. In some implementations, a number of rate sets may be consolidated. For example, in case a certain rate set is too small and fails to provide much diversity for interleaving, the rate set can be consolidated with another rate set.

Figure 6:
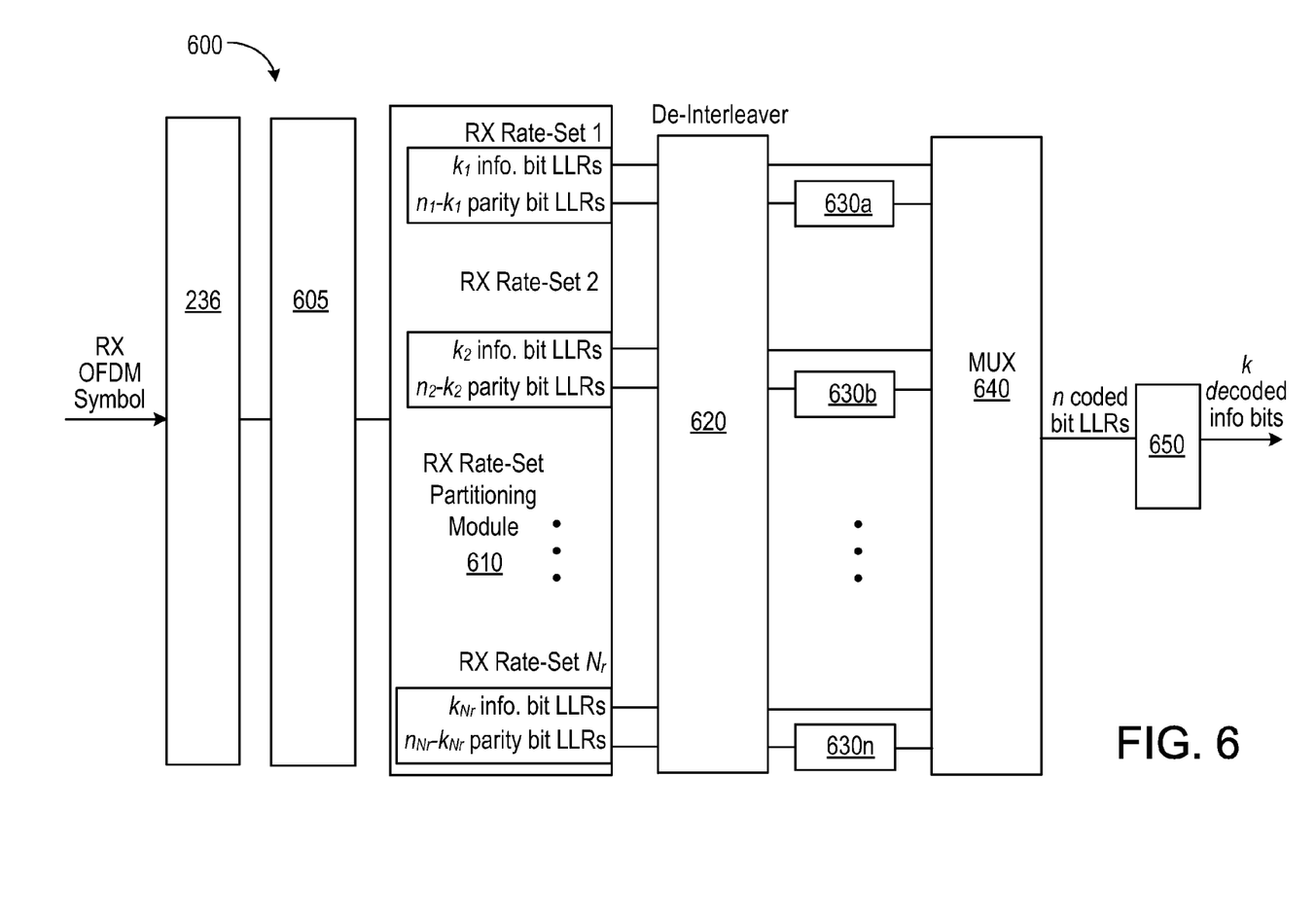
FIG. 6 is a block diagram of an example of a receiver used in a multi-carrier communication system in accordance with some embodiments.

Referring now to FIG. 6, a block diagram depicts a receiver system 600 for decoding symbols transmitted with rate set partitioning. The system 600 includes a DFT module 236, as described with respect to FIG. 2 and a demodulator module 605. Each received OFDM symbol is processed by the DFT module 236 to yield the OFDM carriers. Each OFDM carrier is then demodulated and demapped by the demodulation module 605 (in some cases, based on the carrier's tonemap information) to produce the log-likelihood ratio (LLR) metrics for the information and parity bits contained in that carrier. The LLR metrics are used here for illustrative purposes and should not be considered limiting. Other metrics may also be used to demodulate and/or demap the received symbols. Continuing with the present example, the LLR metrics corresponding to the information and parity bits (for systematic codes) in each OFDM symbol are processed by the receiver rate set partitioning module 610. In some implementations, the module 610 partitions the metrics into $N_r$ rate sets based on the tonemap information. The information and parity bit LLR metrics in each rate set are de-interleaved by the de-interleaver 620. The de-interleaver 620 performs substantially the inverse operation of the interleaving operation performed at the transmitter. Therefore the de-interleaving can be applied in various ways in accordance with the corresponding interleaving performed at the transmitter. The system 600 also includes de-puncturing modules 630a-630n (630 in general) for each of the different rate sets. In some implementations, the parity bit LLR metrics in each rate set are de-punctured based on the puncturing scheme employed at the transmitter. The system 600 also includes a multiplexing module 640 where information bit LLR metrics and the de-punctured parity bit LLR metrics of all rate sets are multiplexed together to produce the LLR metrics for one OFDM symbol. The operations are repeated (with modifications as needed) for all $N_{SYM}$ OFDM symbols until all LLR metrics corresponding to the n bits of one FEC code block are obtained. The n LLR metrics are FEC decoded by the decoding module 650 to produce the k decoded (estimated) information bits.

Figure 7:
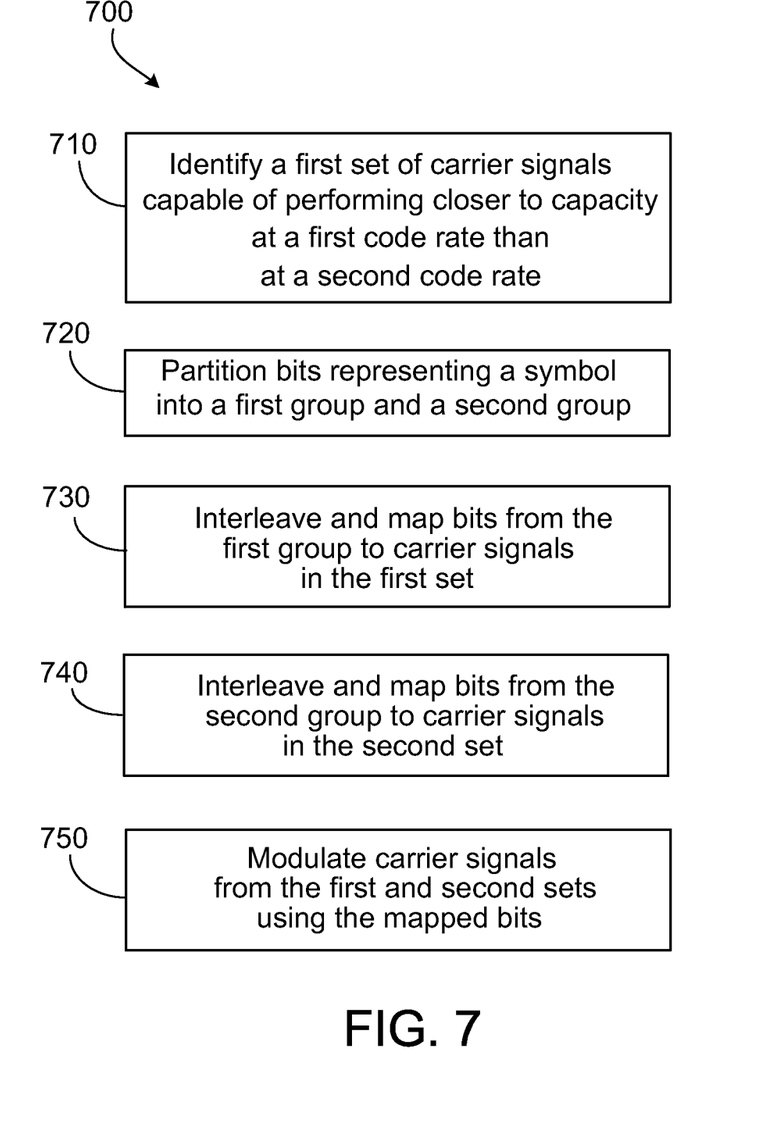
FIG. 7 is a flow diagram depicting an example of sequence of operations in a transmitter.

Referring now to FIG. 7, a flowchart 700 depicting example operations at a transmitter is shown and described. Operations include identifying (step 710) a first set of carrier signals that are capable of performing closer to capacity at a first code rate than at a second code rate. The second code rate may be greater or lesser than the first code rate. Operations also include partitioning (step 720) the bits corresponding to a single symbol (e.g. an OFDM symbol) into a first group and at least a second group of bits. Each of the first and second groups of bits can be associated with a particular code rate such as the first and second code rates, respectively. The bits corresponding to the symbol can be further partitioned into a third or more group of bits each associated with a particular code rate. In some implementations, all the code rates are different from each other. In some implementations, the partitioning operations described above can be implemented using a rate set partitioning module 610 as described with respect to FIG. 6.

Operations also include interleaving and mapping (step 730) bits from the first group to carrier signals of a particular set, e.g. the first set. Similarly, operations also include interleaving and mapping (step 740) bits from the second group to carrier signals of a different set, e.g. the second set. In some implementations, operations may optionally include interleaving and mapping bits from additional groups to carrier signals of a set associated with the group. In some implementations, a subset of the bits in a group is interleaved and mapped to corresponding carrier signals. In some implementations, the mapping is done such that multiple bits from a group are mapped to a particular carrier signal. The interleaving and mapping is performed such that a particular code rate is achieved on average over a given set of carrier signals. For example, multiple bits from a subset of bits from the first group may be mapped to respective carrier signals to achieve a first code rate on an average over the first set of carrier signals. In some implementations, the mapping operation includes assigning a modulation scheme to one or more carrier signals. The interleaving and mapping operations may be implemented using the interleaver 620 and mapping module 222, respectively, as described with respect to FIG. 6.

Operations also include modulating (step 750) multiple carrier signals from a given set using mapped bits from a given group. For example, multiple carrier signals in the first set can be modulated using the mapped bits from the first group and similar operations may be repeated for additional sets of carrier signals. In some implementations, modulating the carrier signals may include performing a transform (such as an IDFT) over data values associated with multiple carrier signals. The modulation operation described above can be implemented using the IDFT module 224 and the mapping module 222 described with respect to FIG. 6.

The techniques described above can be implemented using software for execution on a computer system. For instance, the software defines procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a computer-readable storage medium, such as a CD-ROM, readable by a general or special purpose programmable computer or delivered over a medium (e.g., encoded in a propagated signal) such as network to a computer where it is executed. Each such computer program is preferably stored on or downloaded to a storage medium (e.g., solid state memory or media, or magnetic or optical media) readable by a general or special purpose programmable computer, for configuring and operating the computer system when the storage medium is read by the computer system to perform the procedures of the software.

Many other implementations of the invention other than those described above are within the invention, which is defined by the following claims.

What is claimed is:

1. A method for transmitting information in a multi-carrier system, the method comprising: identifying a first set of carriers and a second set of carriers, the first set of carriers associated with a first code rate on an average over the first set of carriers, and the second set of carriers associated with a second code rate on an average over the second set of carriers, the second code rate different from the first code rate; partitioning a first sequence of forward error correction (FEC) encoded bits representing a single orthogonal frequency division multiplexing (OFDM) symbol into groups of bits including a first group of bits and at least a second group of bits, wherein the first group of bits includes a first quantity of information bits based, at least in part, on a first total of FEC encoded bits associated with carriers of the first set of carriers and the first code rate, and wherein the second group of bits includes a second quantity of information bits based, at least in part, on a second total of FEC encoded bits associated with carriers of the second set of carriers and the second code rate;

interleaving a subset of bits from the first group of bits to map multiple bits from the first group of bits to respective carriers in the first set of carriers in accordance with the first code rate; interleaving a subset of bits from the second group of bits to map multiple bits from the second group of bits to respective carriers in the second set of carriers in accordance with the second code rate; and transmitting the single OFDM symbol, wherein the single OFDM symbol includes one or more carrier signals in the first set of carriers modulated using the mapped bits from the first group of bits associated with the first code rate, and wherein the single OFDM symbol includes one or more carrier signals in the second set of carriers modulated using the mapped bits from the second group of bits associated with the second code rate.

2. The method of claim 1, further comprising identifying a third set of carriers, each carrier in the third set of carriers associated with a third code rate that is different from the first code rate and the second code rate.

3. The method of claim 2, further comprising: partitioning the first sequence of FEC encoded bits into a third group of bits in addition to the first group of bits and the second group of bits; and interleaving bits from the third group of bits to map multiple bits from the third group of bits to respective carriers in the third set of carriers to achieve the third code rate on average over the third set of carriers, wherein the single OFDM symbol includes one or more carrier signals in the third set of carriers modulated using the mapped bits from the third group associated with the third code rate.

4. The method of claim 1, further comprising: producing an encoded set of bits by applying an error correction code with a base code rate to information bits, the encoded set of bits comprising (1) the information bits and redundancy bits introduced via the error correction code or (2) the redundancy bits introduced via the error correction code; and selecting a subset of bits from the encoded set as the first sequence of FEC encoded bits representing the single OFDM symbol.

5. The method of claim 4, wherein the first sequence of FEC encoded bits comprises (1) a subset of the information bits and a subset of the redundancy bits, or (2) a subset of the redundancy bits.

6. The method of claim 5, wherein the first group of bits and the second group of bits each comprises (1) one or more bits from the subset of the information bits and one or more bits from the subset of the redundancy bits, or (2) one or more bits from the subset of the redundancy bits.

7. The method of claim 6, further comprising choosing the multiple bits from the first group of bits to be interleaved and mapped to respective carriers in the first set of carriers in accordance with the first code rate.

8. The method of claim 7, wherein choosing the multiple bits in accordance with the first code rate comprises puncturing the redundancy bits included in the first group of bits using a predetermined puncturing pattern.

9. The method of claim 8, wherein the predetermined puncturing pattern maximizes a distance property for the first code rate.

10. The method of claim 1, wherein, for a given channel between a transmitter and a receiver, the first set of carriers performs closer to a Shannon capacity of the given channel at the first code rate than at the second code rate and the second set of carriers performs closer to the Shannon capacity of the given channel at the second code rate than at the first code rate.

11. The method of claim 1, wherein the first set of carriers includes carriers assigned to different modulation schemes.

12. The method of claim 1, wherein the carriers in the first set and the carriers in the second set are not sequential in terms of their respective frequencies.

13. The method of claim 1, wherein identifying the first set of carriers and the second set of carriers comprises determining a quality metric for each carrier in the first and second sets over a channel between a transmitter and a receiver.

14. The method of claim 13, wherein the quality metric includes at least one of a signal-to-noise ratio, a bit error rate, and a frame error rate.

15. The method of claim 13, wherein the carriers in the first set have an improved quality metric than the carriers in the second set and the first code rate is higher than the second code rate.

16. The method of claim 1, the method further comprising, after said partitioning, applying different puncturing patterns to the first group of bits and the second group of bits to achieve the first code rate different from the second code rate, respectively.

17. The method of claim 1, further comprising:
puncturing at least one of the first group of bits and the second group of bits in accordance with the first code rate and the second code rate, respectively.

18. An apparatus for transmitting information in a multi-carrier system, the apparatus comprising: a partitioning module configured to: identify a first set of carriers and a second set of carriers, the first set of carriers associated with a first code rate on an average over the first set of carriers and the second set of carriers associated with a second code rate on an average over the second set of carriers, the second code rate different from the first code rate, and partition a first sequence of forward error correction (FEC) encoded bits representing a single orthogonal frequency division multiplexing (OFDM) symbol into a first group of bits and at least a second group of bits, wherein the first group of bits includes a first quantity of information bits based, at least in part, on a first total of FEC encoded bits associated with carriers of the first set of carriers and the first code rate, and wherein the second group of bits includes a second quantity of information bits based, at least in part, on a second total of FEC encoded bits associated with carriers of the second set of carriers and the second code rate; an interleaver configured to: interleave a subset of bits from the first group of bits to map multiple bits from the first group of bits to respective carriers in the first set of carriers in accordance with the first code rate, and interleave a subset of bits from the second group of bits to map multiple bits from the second group of bits to respective carriers in the second set of carriers in accordance with the second code rate; and a modulator configured to: modulate, as part of the single OFDM symbol, one or more carrier signals in the first set of carriers using the mapped bits from the first group associated with the first code rate, and modulate, as part of the single OFDM symbol, one or more carrier signals in the second set of carriers using the mapped bits from the second group associated with the second code rate.

19. The apparatus of claim 18, wherein the interleaver comprises a bank of interleavers, each interleaver configured to operate on bits in a given group from the first sequence of FEC encoded bits.

20. The apparatus of claim 18, wherein the interleaver is configured to operate on bits across groups from the first sequence of FEC encoded bits.

21. The apparatus of claim 18, wherein the interleaver is configured to operate on bits from the first sequence of FEC encoded bits prior to being partitioned into groups.

22. The apparatus of claim 18, further comprising: a first puncturing module associated with the first code rate and configured to apply a first puncturing pattern to the first group of bits to achieve the first code rate; and a second puncturing module associated with the second code rate and configured to apply a second puncturing pattern to the second group of bits to achieve the second code rate.

23. The apparatus of claim 18, further comprising: puncturing modules configured to puncture at least one of the first group of bits and the second group of bits in accordance with the first code rate and the second code rate, respectively.

24. A method comprising: partitioning forward error correction (FEC) encoded bits representing a single orthogonal frequency division multiplexing (OFDM) symbol into a first group of bits and at least a second group of bits, wherein the first group of bits includes a first quantity of information bits based, at least in part, on a first total of FEC encoded bits associated with carriers of a first set of carriers and a first code rate, and wherein the second group of bits includes a second quantity of information bits based, at least in part, on a second total of FEC encoded bits associated with carriers of a second set of carriers and a second code rate, wherein the first quantity of information bits is based on a product of the first total of FEC encoded bits associated with carriers of the first set of carriers and the first code rate, and wherein the second quantity of information bits is based on a product of the second total of FEC encoded bits associated with carriers of the second set of carriers and the second code rate; and transmitting the single OFDM symbol having multiple carriers including the carriers of the first set of carriers associated with the first code rate and the carriers of the second set of carriers associated with the second code rate.

25. The method of claim 24, further comprising:
puncturing separately at least one of the first group of bits and the second group of bits to achieve an average of the first code rate over the first set of carriers and an average of the second code rate over the second set of carriers.

26. An apparatus for transmitting information in a multi-carrier system, the apparatus comprising: an encoder module configured to prepare forward error correction (FEC) encoded bits, wherein the encoder module includes a partitioning module configured to: partition a first sequence of FEC encoded bits representing a single orthogonal frequency division multiplexing (OFDM) symbol into a first group of bits associated with a first code rate to use for a first set of carriers and at least a second group of bits associated with a second code rate to use for a second set of carriers, the second code rate different from the first code rate, wherein the first group of bits includes a first quantity of information bits based, at least in part, on a first total of FEC encoded bits associated with carriers of the first set of carriers and the first code rate, and wherein the second group of bits includes a second quantity of information bits based, at least in part, on a second total of FEC encoded bits associated with carriers of the second set of carriers and the second code rate; and a mapping module configured to prepare mapped data from the FEC encoded bits, the mapping module including a serial to parallel converter configured to convert a stream of the FEC encoded bits corresponding to the OFDM symbol into a plurality of data streams having different quantities of bits, the plurality of data streams corresponding to different carrier frequencies of the OFDM symbol, wherein the plurality of data streams have different numbers of bits based, at least in part, on a code rate or a modulation rate for the corresponding carrier frequency of the OFDM symbol; and a modulator configured to operate on the mapped data to produce the OFDM symbol.

27. The apparatus of claim 26, wherein some carriers in the OFDM symbol support a higher order modulation than other carriers modulated in the OFDM symbol, and wherein the encoder module uses a same fixed code rate for all carriers while the mapping module uses different numbers of bits for each of the plurality of data streams based on different modulation rates supported for different carriers of the OFDM symbol.

28. The apparatus of claim 26, wherein the mapping module is further configured to: determine modulation alphabets for each carrier of the OFDM symbol; and determine a fixed code rate for all carriers of the OFDM symbol, wherein some carriers have the same fixed code rate but have different modulation alphabets.

29. The apparatus of claim 26, wherein a first set of carriers are associated with a first code rate and a second set of carriers are associated with a second code rate, and wherein the mapping module is further configured to spread the FEC encoded bits associated with the first set of carriers across multiple OFDM symbols to achieve the first code rate on average for the first set of carriers.

30. The apparatus of claim 26, wherein the encoder module includes: the partitioning module further configured to: identify the first set of carriers and the second set of carriers, the first set of carriers associated with the first code rate on an average over the first set of carriers and the second set of carriers associated with the second code rate on an average over the second set of carriers; and an interleaver configured to: interleave a subset of bits from the first group of bits to map multiple bits from the first group of bits to respective carriers in the first set of carriers in accordance with the first code rate, and interleave a subset of bits from the second group of bits to map multiple bits from the second group of bits to respective carriers in the second set of carriers in accordance with the second code rate.

\* \* \* \* \*